(12) United States Patent
Godowski et al.

(10) Patent No.: US 12,001,864 B2
(45) Date of Patent: *Jun. 4, 2024

(54) CONTAINERIZED SOFTWARE DISCOVERY AND IDENTIFICATION

(71) Applicant: INTERNATIONAL BUSINESS MACHINES CORPORATION, Armonk, NY (US)

(72) Inventors: Piotr P. Godowski, Cracow (PL); Michal Paluch, Cracow (PL); Tomasz Hanusiak, Cracow (PL); Szymon Kowalczyk, Cracow (PL); Andrzej Pietrzak, Podleze (PL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 677 days.

This patent is subject to a terminal disclaimer.

(21) Appl. No.: 17/134,086

(22) Filed: Dec. 24, 2020

(65) Prior Publication Data

US 2022/0091866 A1  Mar. 24, 2022

Related U.S. Application Data

(63) Continuation of application No. 17/027,275, filed on Sep. 21, 2020.

(51) Int. Cl.
*G06F 9/455* (2018.01)
*G06F 3/06* (2006.01)
*G06F 16/28* (2019.01)

(52) U.S. Cl.
CPC ............ *G06F 9/455* (2013.01); *G06F 3/0604* (2013.01); *G06F 3/0631* (2013.01);
(Continued)

(58) Field of Classification Search
None
See application file for complete search history.

(56) References Cited

U.S. PATENT DOCUMENTS 10,089,209 B1   10/2018  Russell
10,635,406 B2 *  4/2020  Brandys .................. G06F 8/60
(Continued)

FOREIGN PATENT DOCUMENTS

CN    111597014 A    8/2020
WO    2022057634 A1   3/2022

OTHER PUBLICATIONS

IBM: List of IBM Patents or Patent Applications Treated as Related, May 11, 2021, 2 pg.
(Continued)

*Primary Examiner* — Eric C Wai
(74) *Attorney, Agent, or Firm* — CUENOT, FORSYTHE & KIM, LLC

(57) ABSTRACT

Containerized software discover and identification can include discovering a plurality of container remnants by electronically scanning portions of computer memory of at least one computer system of one or more of computing nodes, the portions of computer memory being allocated to persistent storage of computer data, and each container remnant containing computer data providing a record of system-generated execution attributes generated in response to execution of one or more containerized applications. One or more inactive container remnants unutilized by a currently running containerized application can be identified among the plurality of container remnants. Each inactive container remnant can be categorized, the categorizing being based on system-generated execution attributes contained in each inactive container remnant. Based on the categorizing, a previously run containerized application can be identified
(Continued)

by reference to a database comprising data whose structures map identities of containerized applications to patterns of execution attributes.

7 Claims, 8 Drawing Sheets

(52) U.S. Cl.
CPC .......... *G06F 3/0673* (2013.01); *G06F 16/285* (2019.01); *G06F 2218/12* (2023.01)

(56) References Cited

U.S. PATENT DOCUMENTS

| | | | |
|---|---|---|---|
| 11,307,937 B1 * | 4/2022 | Cheng | G06F 11/1453 |
| 11,645,333 B1 * | 5/2023 | Chinthekindi | G06F 16/9014 |
| | | | 707/747 |
| 2015/0150025 A1 | 5/2015 | Yuen et al. | |
| 2018/0144263 A1 | 5/2018 | Saxena et al. | |
| 2018/0232141 A1 | 8/2018 | Avraham et al. | |
| 2019/0007394 A1 | 1/2019 | Patel et al. | |
| 2019/0108116 A1 | 4/2019 | Benes et al. | |
| 2019/0155578 A1 | 5/2019 | Brandys et al. | |
| 2019/0197178 A1 | 6/2019 | Agrawal et al. | |
| 2019/0324786 A1 | 10/2019 | Ranjan et al. | |
| 2020/0186534 A1 | 6/2020 | Chanda et al. | |
| 2022/0091865 A1 | 3/2022 | Godowski et al. | |

OTHER PUBLICATIONS

Godowski, P.P. et al., "Containerized Software Discovery and Identification", U.S. Appl. No. 17/027,275, filed Sep. 21, 2020, 41 pages.

"Flexera Announces Discovery and Inventory Capabilities for Containers," [online] © 2020 Flexera, Apr. 9, 2020, retrieved from the Internet: <www.flexera.com/about-us/press-center/flexera-announces-discovery-inventory-capabilities-containers.html>, 3 pg.

"Label Schema, Bringing Structure to Labels," [online] label-schema@googlegroups.com, [retrieved Aug. 20, 2020], retrieved from the Internet: <label-schema.org/rc1/>, 7 pg.

"GitHub—IBM/IBM—Licensing-operator: Operator for IBM License Service," [online] GitHub, Inc. © 2020, [retrieved Aug. 20, 2020] retrieved from the Internet: <github.com/IBM/ibm-licensing-operator>, 31 pg.

Mell, P. et al., The NIST Definition of Cloud Computing, National Institute of Standards and Technology, U.S. Dept. of Commerce, Special Publication 800-145, Sep. 2011, 7 pg.

WIPO Appln. No. PCT/CN2021/116195, International Search Report and Written Opinion, dated Dec. 1, 2021, 10 pg.

IBM: List of IBM Patents or Patent Applications Treated as Related, Jul. 28, 2022, 2 pg.

Godowski, P.P. et al., "Containerized Software Discovery and Identification", WIPO Patent Application No. PCT/CN2021/116195, filed Sep. 2, 2021, 39 pg.

* cited by examiner

CONTAINERIZED SOFTWARE DISCOVERY AND IDENTIFICATION

BACKGROUND

This disclosure relates to software discovery and identification, and more particularly, to discovery and identification of containerized software.

Containerized software provides a complete runtime environment bundled in a single container or package comprising an application (code) and all the application's dependencies, such as configuration files, libraries, and other binaries needed to run the application. In contrast to a virtual machine, a container does not include a separate operating system (OS). Instead, a container accesses read-only portions of an OS kernel that can be shared with other containers executing on a host machine. A container is thus not only complete but lightweight in terms of the amount of code and types of software needed for executing an application. In the context of cloud-based computing, a container typically deploys rapidly, executes efficiently, and migrates readily within a cloud computing environment.

SUMMARY

In one or more embodiments, a method can include discovering a plurality of container remnants by electronically scanning portions of computer memory of at least one computer system of one or more computing nodes, wherein the portions of computer memory are allocated to persistent storage of computer data, and wherein each container remnant contains computer data providing a record of system-generated execution attributes generated in response to execution of one or more containerized applications. The method also can include identifying among the plurality of container remnants one or more inactive container remnants unutilized by a currently running containerized application. Additionally, the method can include categorizing each inactive container remnant, wherein the categorizing is based on system-generated execution attributes contained in each inactive container remnant. The method also can include identifying, based on the categorizing, a previously run containerized application by reference to a database comprising data whose structure maps identities of containerized applications to patterns of execution attributes.

In one or more embodiments, a system includes a processor configured to initiate operations. The operations can include discovering a plurality of container remnants by electronically scanning portions of computer memory of at least one computer system of one or more computing nodes, wherein the portions of computer memory are allocated to persistent storage of computer data, and wherein each container remnant contains computer data providing a record of system-generated execution attributes generated in response to execution of one or more containerized applications. The operations also can include identifying among the plurality of container remnants one or more inactive container remnants unutilized by a currently running containerized application. Additionally, the operations can include categorizing each inactive container remnant, wherein the categorizing is based on system-generated execution attributes contained in each inactive container remnant. The operations also can include identifying, based on the categorizing, a previously run containerized application by reference to a database comprising data whose structure maps identities of containerized applications to patterns of execution attributes.

In one or more embodiments, a computer program product includes one or more computer readable storage media having instructions stored thereon. The instructions are executable by a processor to initiate operations. The operations can include discovering a plurality of container remnants by electronically scanning portions of computer memory of at least one computer system of one or more computing nodes, wherein the portions of computer memory are allocated to persistent storage of computer data, and wherein each container remnant contains computer data providing a record of system-generated execution attributes generated in response to execution of one or more containerized applications. The operations also can include identifying among the plurality of container remnants one or more inactive container remnants unutilized by a currently running containerized application. Additionally, the operations can include categorizing each inactive container remnant, wherein the categorizing is based on system-generated execution attributes contained in each inactive container remnant. The operations also can include identifying, based on the categorizing, a previously run containerized application by reference to a database comprising data whose structure maps identities of containerized applications to patterns of execution attributes.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1:
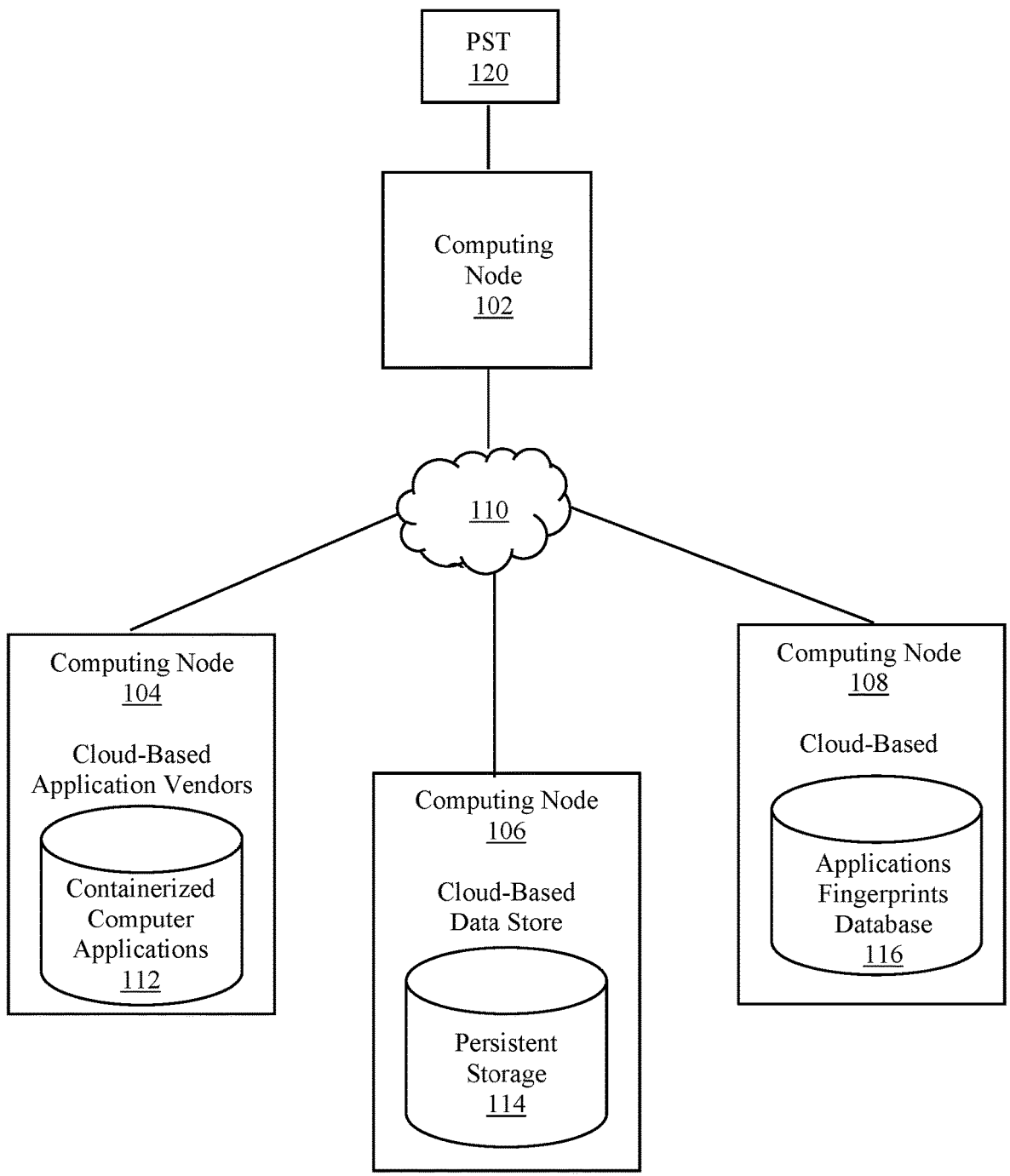
FIG. 1 depicts an example computing environment including a computing node for implementing a postmortem scanning tool for identifying containerized applications according to an embodiment.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to software discovery and identification, and more particularly, to discovery and identification of containerized software. A growing number of consumers—especially large enterprises—have come to rely on cloud-based, vendor-distributed containerized applications. Many such applications are based on a microservice architecture, according to which the applications comprise multiple containers capable of running on multiple machines that are collocated or dispersed at different geographical locations. Containerized software is structured such that the software has no machine-specific dependencies (e.g., libraries or shared packages). Instead, the container can package an application's code with libraries, configurations, system tools, and/or other dependencies. Containerization enables applications to use, for example, the same Linux kernel as the computer system on which the applications are running. The applications thus can be deployed with only the code and objects not already running on a host. Additionally, a container orchestration system (e.g., Kubernetes™) can automate deployment, scaling, load balancing, and management of containerized applications, and can facilitate communication and cooperation among multiple containers.

Notwithstanding the technical benefits afforded by containerized applications, there remains a challenge pertinent to both vendors and consumers of such applications when integrated into a cloud platform. The challenge arises a result of the underlying nature of containers—namely, that once execution of a containerized application is complete, the container itself "dies." That is, the application's image is instantiated to create a container to run the application, but once the application has run, the container is deleted from the computer system. The container is ephemeral. As a result, the identity of the containerized application, as well as proof that the application executed disappears as well.

Manually tracking usage of individual containerized applications is likely infeasible if not wholly impossible, especially for an enterprise having multiple users who use many different applications many times. Software asset management (SAM) programs, software probes, or similar such tools can be utilized, but provide only periodic monitoring. Monitoring examines samples of programs, or snapshots, only at periodic intervals. The more frequently the program sampling is performed, the greater the amount of system resources used for monitoring, which cuts against one significant advantage of using containerized applications. Moreover, no matter how frequent the periodic monitoring, there remains a time gap between periods. During the inevitable time gap, difficulty tracking vendor-distributed containerized applications can increase a customer's licensing obligations without the customer's awareness and even expose an enterprise to liability if an agent of the enterprise uses an application without authorization.

The problem is likely to be exacerbated if, as some predict, vendors move away from term subscriptions to use-time pricing. A customer who may use a containerized application only a few times or for a short duration, for example, may not want to be bound to a yearly subscription. Thus, it may be imperative to be able to identify and track usage of containerized applications, especially during the time gaps between periodic monitoring with a probe or other software tool.

The arrangements described herein are directed to computer technology and provide an improvement to existing computer technology. The arrangements improve computer technology by providing machine-based discovery and identification of previously run containerized applications not otherwise discoverable or identifiable by periodic monitoring. In the context of running containerized applications utilizing persistent as well as ephemeral volumes, another improvement is a mechanism for deleting persistent volumes, thus freeing up computing resources when the persistent volumes are no longer needed.

In certain embodiments, the systems, methods, and computer program products disclosed herein operate within a computing environment comprising multiple computing nodes connected via a data communications network for the provisioning of containerized applications. Operatively, a system according to some embodiments discovers one or more container remnants by electronically scanning portions of computer memory of one or more computer systems. As defined herein, a "container remnant" is a collection of computer data generated by an executing or a completed execution of a containerized application. The computer data comprises system-generated execution attributes characterizing the execution of the containerized application. The execution attributes are leftovers of the execution. As defined herein, "execution attributes" are actions, events, parameters, and other data that characterize a particular execution of a containerized application by a computer system.

Notably, a container remnant does not identify the containerized application whose execution generated the data contained therein. Nonetheless, in an aspect of the systems, methods, and computer program products disclosed herein, container remnants are used as a clue to discover and identify the likely containerized applications whose prior executions generated the container remnants. An aspect of a container remnant is persistent storage. That is, though the container of the containerized application is ephemeral, the container remnant is persistent. A container remnant can comprise a log stream (e.g., log file, configuration file, core dump, backup file, directory, sub-directory) or, in the context of containers managed by a container orchestration system, a persistent volume. Each such persistent volume, file, or log stream contains execution attributes, the execution attributes providing records of actions, events, parameters, and other data that characterize the running or execution of a containerized application on a computer system.

At a given instant, a container remnant may be utilized by a currently running containerized application. Accordingly, another aspect of the systems, methods, and computer program products disclosed herein is distinguishing persistently stored container remnants not utilized by a currently running containerized application from ones currently used by a containerized application. As defined herein, an "active container remnant" is a container remnant utilized by a currently running containerized application. An "inactive container remnant," as defined herein, is a container remnant unutilized by a currently running containerized application Multiple container remnants (different persistent volumes and/or log streams) not utilized by a currently running containerized application may correspond to a single containerized application that previously executed, especially given that complex applications may execute in multiple containers. Thus, another aspect of the systems, methods, and computer program products disclosed herein is the categorizing of inactive container remnants, each category corresponding to a specific containerized application whose execution on a computer system has completed or otherwise terminated. The ephemeral container of the containerized application "dies" (is deleted) upon completion of execution or termination of the running of the containerized application on a computer system.

The categorizing can be based on pattern recognition that identifies log streams and/or persistent volumes whose data patterns make it statistically likely that each belongs in the same category. The systems, methods, and computer program products disclosed herein determine the likely identity of a containerized application that has previously run by reference to a database comprising data structures that map identities of containerized applications to specific execution attributes. The data structures thus provide a kind of fingerprint for identifying a previously run containerized application.

The ability to discover and determine the likely identity of containerized applications that have previously run provides several advantages. For example, potential license liability for use of containerized applications can be estimated. For an enterprise comprising multiple users, for example, the unauthorized running of containerized applications can be identified. The identification also can be used as part of a trend analysis of the types of containerized applications an enterprise is likely to use in the future. Based on such identification, more efficient allocation of computing resources can be achieved and maintained. For example, efficient allocation of computing resources within the specific context of a container-orchestration system can include, as noted above, the deletion or elimination of persistent volumes that are no longer needed to support a containerized application.

More generally, the capability to identify previously run containerized applications can be coupled with or integrated in various software tracing tools, used for example by system administrators for maintaining system security or technical support specialists for debugging purposes. Discovery and identification of containerized applications also provides data for predicting future infrastructure requirements (hardware and software) for hosting increased workloads based on a trend analysis. Trend analysis can also be used to optimize acquisitions and renewals of cloud computing licenses, for example.

Further aspects of the embodiments described within this disclosure are described in greater detail with reference to the figures below. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 depicts example computing environment 100. Computing environment 100 illustratively comprises a cloud-based computing environment having features such as ones described in greater detail below with reference to FIGS. 6 and 7. Computing environment 100 illustratively includes multiple computing nodes, each comprising some or all of the hardware components (e.g., processors, memories, I/O interfaces and devices) and computing resources described below with reference to FIG. 8. Computing node 102 can comprise one or more standalone devices (e.g., server, desktop computer, laptop, table, smartphone, smart-watch, and the like) or a computing system utilizing clustered computers and components that provide a single pool of seamless resources.

Computing environment 100 also illustratively includes computing nodes 104, 106, and 108. Computing nodes 102-108 are communicatively coupled via data communications network 110. Data communications network 110 can be, for example, the Internet, a wide area network (WAN), local area network (LAN) or a combination of these and/or other types of networks and can include wired, wireless, fiber optic and/or other connections.

Computing node 104 comprises one or more cloud-based vendor servers for provisioning containerized applications 112 to computing node 102. One or more of containerized applications 112 can be executed at the request of computing node 102, the request conveyed to a cloud-based vendor via data communications network 110. Computing node 106 provides cloud-based storage accessible to the other computing nodes via data communications network 110. The cloud-based storage includes persistent storage 114. Persistent storage 114 can encompass log streams, configuration files, directory structures, sub-directories, core dumps, diagnostic logs, startup records, backup files, and the like, all of which record various execution attributes associated with an instantiation or running of a containerized application. In the specific context of a container orchestration framework such as Kubernetes™, for example, persistent storage 114 comprises persistent volumes in addition to or in lieu of log streams and other types of persistent storage. Collectively, persistent storage 114 (including persistent volumes) comprises container remnants containing execution attributes, as defined above.

Computing node 108 is illustratively a cloud-based server, which stores certain data in applications fingerprints database 116. The structure of data contained in applications fingerprints database 116, as described in greater detail below, maps identifiers of specific containerized applications to electronically recorded execution attributes generated by a computer system's running of (or executing) the containerized computer applications. Thus, each such data structure serves as a kind of "fingerprint" that maps predetermined application identities to execution attributes generated by execution of the containerized applications. Collectively, the data structures of applications fingerprints database 116 provide a catalog or an index for matching containerized applications with patterns of execution attributes.

Postmortem scanning tool (PST) 120 is a software tool that, as also described below, references applications fingerprints database 116 in discovering and identifying previously run containerized applications after the containers used in the execution of the containerized applications have "died"—that is, after the ephemeral containers that exist only during the running of the containerized applications have been deleted from a computer system. PST 120 can be deployed into the cloud (e.g., at administrator-access level) by computing node 102 to identify any of containerized applications 112 the computing node runs once the containers themselves have died following execution.

Although computing environment 100 illustratively includes four computing nodes, it should be apparent that in other embodiments a computing environment in which PST 120 is operable may include more or fewer computing nodes than those shown. Moreover, systems such as vendor provisioning of containerized applications and persistent storage can be integrated in and their functions performed on single computing node. PST 120 likewise can be deployed by the same computing node in which a database of containerized application "fingerprints" is stored. In other embodiments, one or more of computing nodes 102-108 can comprise a virtual machine (e.g., virtual server) for implementing the systems and functions described herein.

Figure 2:
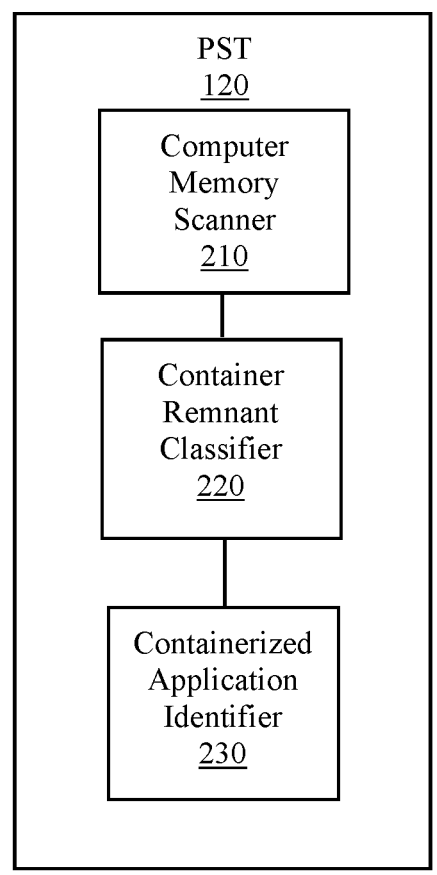
FIG. 2 depicts an example postmortem scanning tool according to an embodiment.

Referring additionally to FIG. 2, certain components of an embodiment of PST 120 are depicted. PST 120 illustratively comprises computer memory scanner 210, container remnant classifier 220, and containerized application identifier 230. Optionally, PST 120 can be deployed in computing environment 100 (which can comprise a cloud-based computing environment) at the administrator-access level. Computer memory scanner 210, container remnant classifier 220, and containerized application identifier 230 in certain embodiments are implemented in software that executes on one or more processors of one or more computer systems, such as processor 816 of computer system 812 described below with reference to FIG. 8.

Operatively, computer memory scanner 210 of PST 120 electronically scans one or more portions of computer memory of at least one computer system, the portions of computer memory allocated to persistent storage (persistent volumes and/or log streams) of computer data. Each container remnant contains computer data providing a record of system-generated execution attributes generated in response to execution of one or more containerized applications. Computer memory scanner 210 identifies among the discovered container remnants one or more inactive container remnants, that is, container remnants unutilized by a currently running containerized application.

Computer memory scanner 210, in certain embodiments, identifies inactive container remnants by initially distinguishing between container remnants that are being utilized by a currently running containerized application and container remnants container remnants not being utilized by a currently running containerized application. To distinguish between the two, computer memory scanner 210 identifies persistently stored container remnants that are being utilized by a currently running containerized application. Any such active container remnant can contain some execution attributes and yet will also be in the process of recording additional ones as an on-going execution of the containerized application continues to completion.

In some embodiments, computer memory scanner 210 identifies one or more active container remnants utilized by a currently running containerized application by identifying the file handle of a file in the container of a currently running containerized application. The file handle provides an indicator (e.g., number) that an OS assigns temporarily to an open containerized file. Computer memory scanner 210 identifies the one or more container remnants holding the file handle as active container remnants being utilized by a currently running containerized application, namely, the one corresponding to the file handle. In embodiments in which the OS is a Linux™ or Unix-like OS, computer memory scanner 210 can utilize the Lsof ("list of files") command to determine, based on file handles, active container remnants utilized by currently running containerized applications.

In other embodiments, especially in the context of a container-orchestration system that manages containers using persistent as well as ephemeral volumes, computer memory scanner 210 identifies active container remnants utilized by currently running containerized applications by identifying persistent volume claims that bind persistent volumes to specific containers. An example of code for generating a persistent volume claim is:

```
api Version: VL
kind: PersistentVolumeClaim
metadata:
    name: database-persistent-volume-claim
spec:
    accessModes:
        --ReadWriteOnce
    recources:
        requests:
            storage: 2Gi
```

A persistent volume can be created in a host machine and mounted under a directory or folder inside a container, giving the container exclusive access to the persistent volume. Alternatively, a local directory in the host machine can be mounted as a persistent volume inside a container such that data is shared between the host machine and container. A container mount point reference found under or in the directory or folder of the container corresponds to the containerized application that utilizes the persistent volume bound to the persistent volume claim. Computer memory scanner 210 can analyze executed container mount points in identifying container remnants (persistent volumes) utilized by currently running containerized applications.

Having thus identified active container remnants that are utilized by currently running containerized applications, computer memory scanner 210 ignores any and all active container remnants and identifies the remaining container remnants as inactive container remnants unutilized by currently running containerized applications. Although an inactive container remnant does not explicitly identify or otherwise correspond to a containerized application whose execution caused a computer system to generate execution attributes contained therein, the record of execution attributes do provide a clue as to the identity of the containerized application whose execution has completed or otherwise terminated.

Container remnant classifier 220 of PST 120 categorizes the inactive container remnants identified by computer memory scanner 210. The inactive container remnants are classified by container remnant classifier 220 based on the system-generated execution attributes contained in each container remnant identified as unutilized by a currently running containerized application.

A container remnant can contain various types of data that correspond to and provide a record of execution attributes. The container remnant can include, for example, log files, configuration files, directories, sub-directories, core dumps, diagnostic logs, startup records, backup files, and the like. The log file, for example, can provide a record of events that occur in an operating system or other software during execution. Similarly, for example, the configuration file can provide a record of parameters and initial setting of a program. A core dump, for example, can provide a record of the state of memory of a program at a specific instance, typically at the point a program crashes or otherwise terminates abnormally. Relatedly, a diagnostic log can record data for diagnosing abnormal events or actions occurring during execution. In the present context, the data collectively provides a record of these and various other execution attributes corresponding to execution of a containerized application the running of which has completed or otherwise terminated.

Container remnant classifier 220 performs pattern recognition to categorize the inactive container remnants. Inactive container remnants containing the same or similar patterns of execution attributes are assigned to the same category by container remnant classifier 220. For example, inactive container remnants containing the same or similar log files and configuration files can be assigned to the same category, which corresponds to a single containerized application. Likewise, for example, inactive container remnants containing the same or similar directory structures or sub-directories within directories can be assigned to the same category. Different inactive container remnants may be created by execution of different containers jointly used by a single, complex containerized application. Based on the pattern recognition, container remnant classifier 220 places the same or similar container remnants in the same category, the category corresponding to a single—albeit as yet unidentified—containerized application. The categories to which inactive container remnants are assigned by container remnant classifier 220 based on pattern recognition can define a superset of file types (e.g., log file entries, config entries) matching the same pattern—that is, sharing the same version string or having the same startup log entries, for example, as described above. In certain embodiments, the pattern recognition performed by container remnant classifier 220 is a statistical analysis that determines the probability or likelihood that container remnants were generated by execution of the same containerized application.

Container remnant classifier 220, in some embodiments, uses statistical clustering to perform the pattern recognition. Using a statistical clustering algorithm, container remnant classifier 220 determines which inactive container remnants contain the same or statistically similar patterns of execution attributes. The clustering identifies a set of attributes that are common across different file types. For example, a cluster can define the set of unique application version strings in the log files or configuration files corresponding to a containerized application. Based on the statistical clustering, container remnant classifier 220 assigns inactive container remnants containing the same or statistically similar patterns of execution attributes to the same category.

Containerized application identifier 230, for each category generated by container remnant classifier 220, compares the recognized pattern of execution attributes to data stored in applications fingerprints database 116. Patterns of execution attributes contained in the container remnants, as noted, serve as a kind of fingerprint of the containerized applications whose execution generated the container remnants. The data structure of the data stored in applications fingerprints database 116 serves as a catalog or index that maps predetermined patterns to the specific identities of containerized applications. In certain embodiments, for example, the data structure of the data stored in applications fingerprints database 116 includes a file name, file extension, and optionally, a file size. Containerized application identifier 230 thus references applications fingerprints database 116 to associate one or more inactive container remnants with the identity of a container application. Typically, absent an exact match between the pattern of execution attributes contained in a container remnant and that of an entry in applications fingerprints database 116, containerized application identifier 230 can perform a statistical analysis to determine whether there is a statistical correlation (at a predetermined confidence level) between the execution attributes contained in one or more inactive container remnant and the execution attributes of one of the data structures that map execution attributes to the identity of a containerized application.

Given an unlikeliness of an exact match, a fuzzy matching technique can be used in accordance with certain embodiments. Fuzzy matching techniques enable database searches for similar though not identical entries matching a query, using derivatives of the query for an approximate matching whose likelihood of correctly matching the query meets a predetermined threshold. For example, in some embodiments, containerized application identifier 230 uses a Levenstein distance algorithm for achieving fuzzy matching of a pattern of execution attributes contained in a container remnant with that of an entry in applications fingerprints database 116. In some embodiments, an 80% threshold level can be used, though in other embodiments a different threshold may be used by containerized application identifier 230 in applying the Levenstein distance algorithm.

Optionally, in some embodiments, PST 120 can generate an evidence-of-execution list that comprises the identities of each containerized application discovered and identified based on one or more container remnants and reference to applications fingerprints database 116. Concurrently with making an identification, PST 120 can insert the identity into an evidence-of-execution data structure. The data structure can include a containerized application name and the number of times the same containerized application was discovered and/or the duration that the containerized application ran each time during a predetermined time interval.

Figure 3:
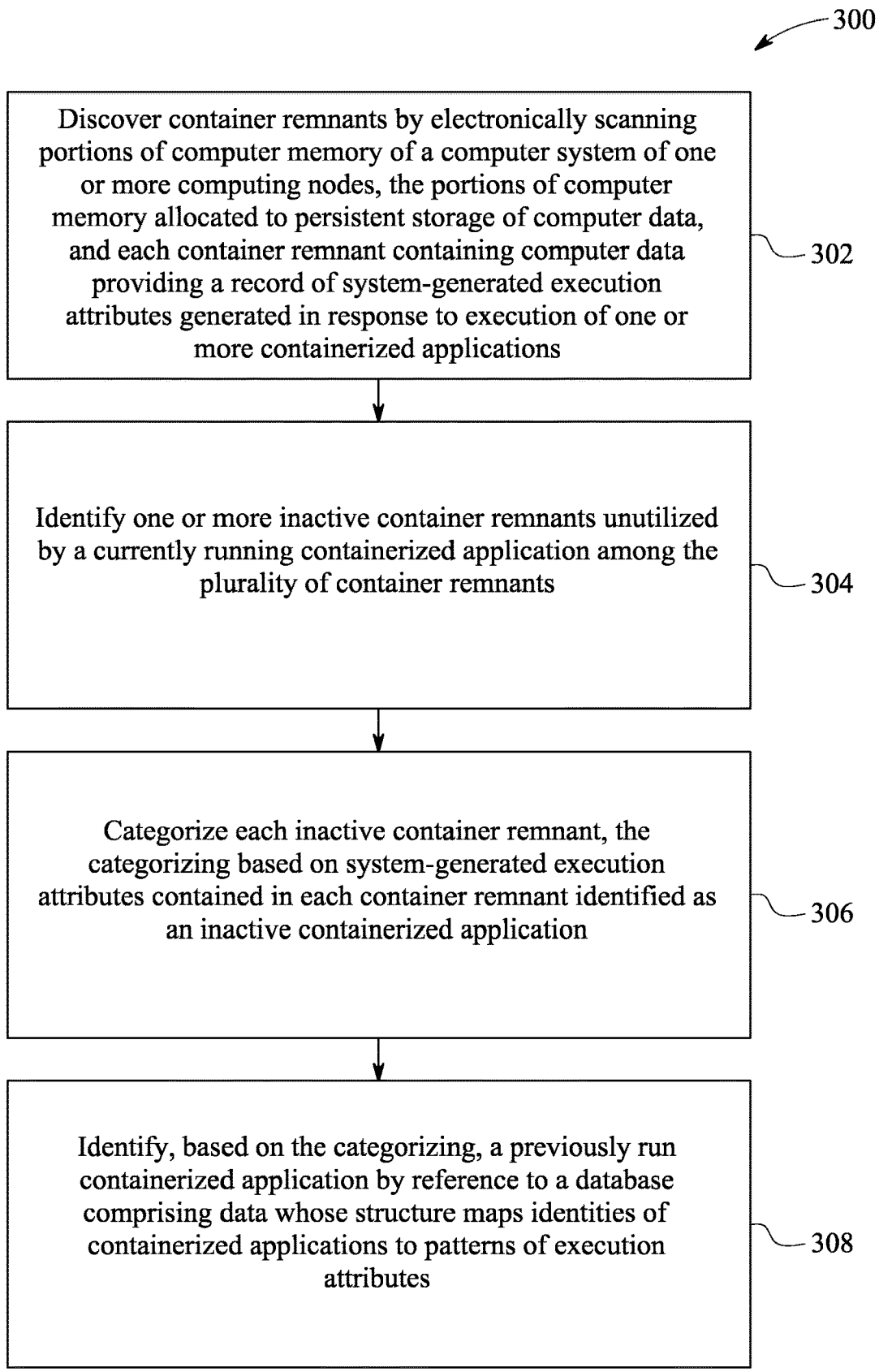
FIG. 3 is a flowchart of a method of identifying previously run containerized applications according to an embodiment.

FIG. 3 is a flowchart of method 300 for identifying prior executions of containerized applications according to an embodiment. Method 300 can be performed by the same or similar systems as are described with reference to FIGS. 1 and 2. The system can be a computer system operating in a computing environment comprising multiple computing nodes connected via a data communications network for provisioning containerized applications. At block 302 the system discovers a plurality of container remnants by electronically scanning portions of computer memory of at least one computer system of one or more of the computing nodes. The portions of computer memory can be allocated to persistent storage of computer data, and each container remnant can contain computer data providing a record of system-generated execution attributes generated in response to execution of one or more of the containerized applications. The system at block 304 identifies one or more inactive container remnants unutilized by a currently running containerized application among the plurality of container remnants.

At block 306, the system categorizes each inactive container remnant. The system categorizes each inactive container remnant based on system-generated execution attributes contained in each of the identified inactive container remnants. The system at block 308, based on the categorizing, identifies a previously run containerized application by reference to a database comprising data whose structure maps identities of containerized applications to one or more patterns of execution attributes. The structure of the data in some embodiments can comprise a file name and file extension that maps to a containerized application name. Optionally, in yet other embodiments, once a previously executed containerized application is identified by the system by reference to the database, the system can insert the identity into an evidence-of-execution data structure.

Figure 4:
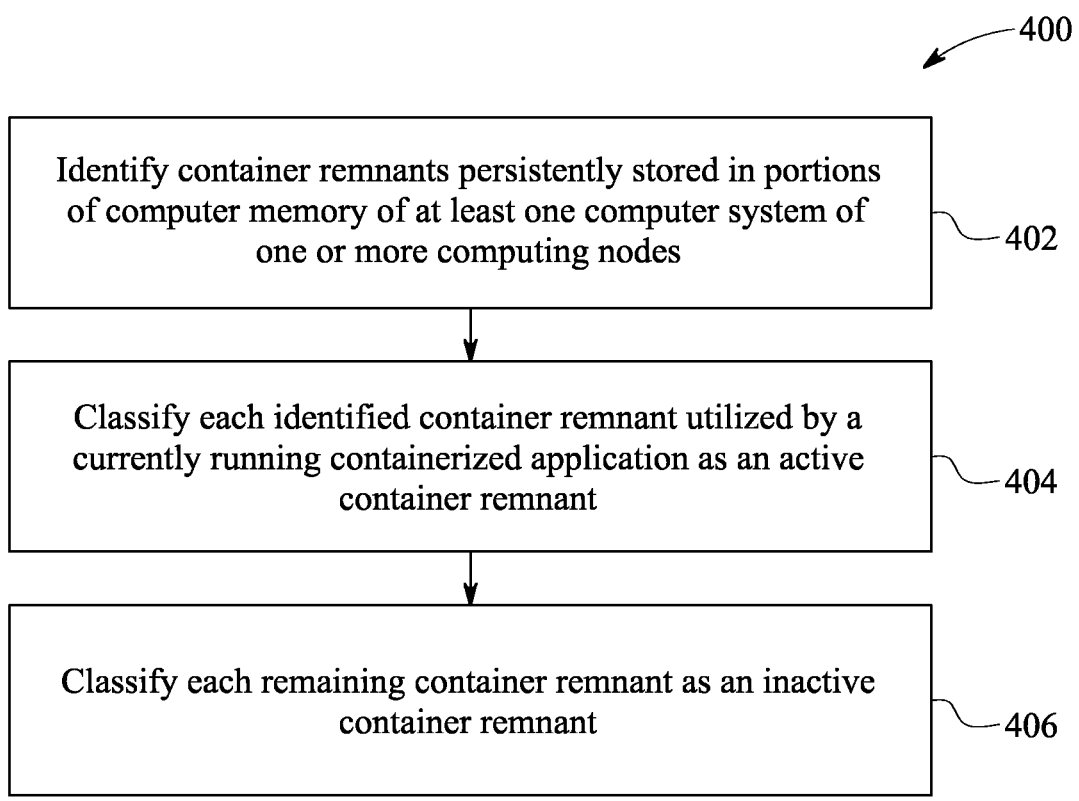
FIG. 4 is a flowchart of a method of identifying containerized applications not utilized by a currently running containerized application according to an embodiment.

FIG. 4 is a flowchart of method 400 for identifying inactive container remnants unutilized by a currently running containerized application according to an embodiment. Method 400 also can be performed by the same or similar systems as are described with reference to FIGS. 1 and 2. The system at block 402 identifies container remnants persistently stored in portions of computer memory of at least one computer system of one or more computing nodes. In certain embodiments the system identifies all such persistently stored container remnants. At block 404, the system classifies each persistently stored container remnant utilized by a currently running containerized application as an active container remnant. The system at block 406 ignores persistently stored container remnants classified as active container remnants and classifies each remaining container remnant as an inactive container remnant (one unutilized by a currently running application).

In certain embodiments the system identifies a container remnant utilized by a currently running containerized application by identifying a persistently stored container remnant containing a file handle. The system identifies the file handle and searches for a match to a file handle of a currently running containerize application. The container remnant is classified as a container remnant utilized by a currently running containerized application based on the file handle, the currently running containerized application corresponding to the file handle. A file handle that does not match the file handle of a currently executing containerized application indicates that the container remnant containing the file handle is an inactive container remnant.

In some embodiments, a persistently stored container remnant can comprise a persistent volume. The system can categorize the persistent volume as a container remnant utilized by a currently running containerized application based on a persistent volume claim. The persistent volume is categorized as a container remnant utilized by a currently running containerized application in which the containerized application is one that is bound to the persistent volume by the persistent volume claim.

Figure 5:
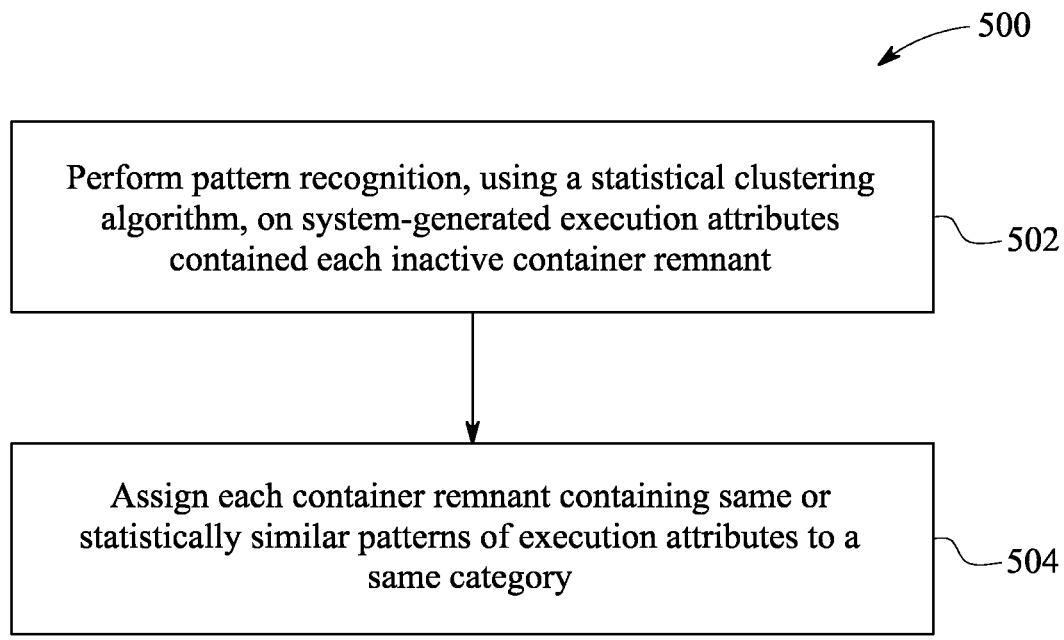
FIG. 5 is a flowchart of a method of categorizing container remnants generated by previously executed containerized applications according to an embodiment.

FIG. 5 is a flowchart of method 500 for categorizing container remnants identified as not utilized by a currently running containerized application according to an embodiment. Method 500 likewise can be performed by the same or similar systems as are described with reference to FIGS. 1 and 2. The system at block 502 performs pattern recognition on each container remnant identified as not utilized by a currently running containerized application. In certain embodiments, the pattern recognition is performed using a statistical clustering algorithm on the system-generated execution attributes contained in each container remnant identified as not utilized by a currently running containerized application. At block 504, the system based on statistical clustering assigns container remnants containing the same or statistically similar patterns of execution attributes to the same category.

It is expressly noted that although this disclosure includes a detailed description on cloud computing, implementations of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
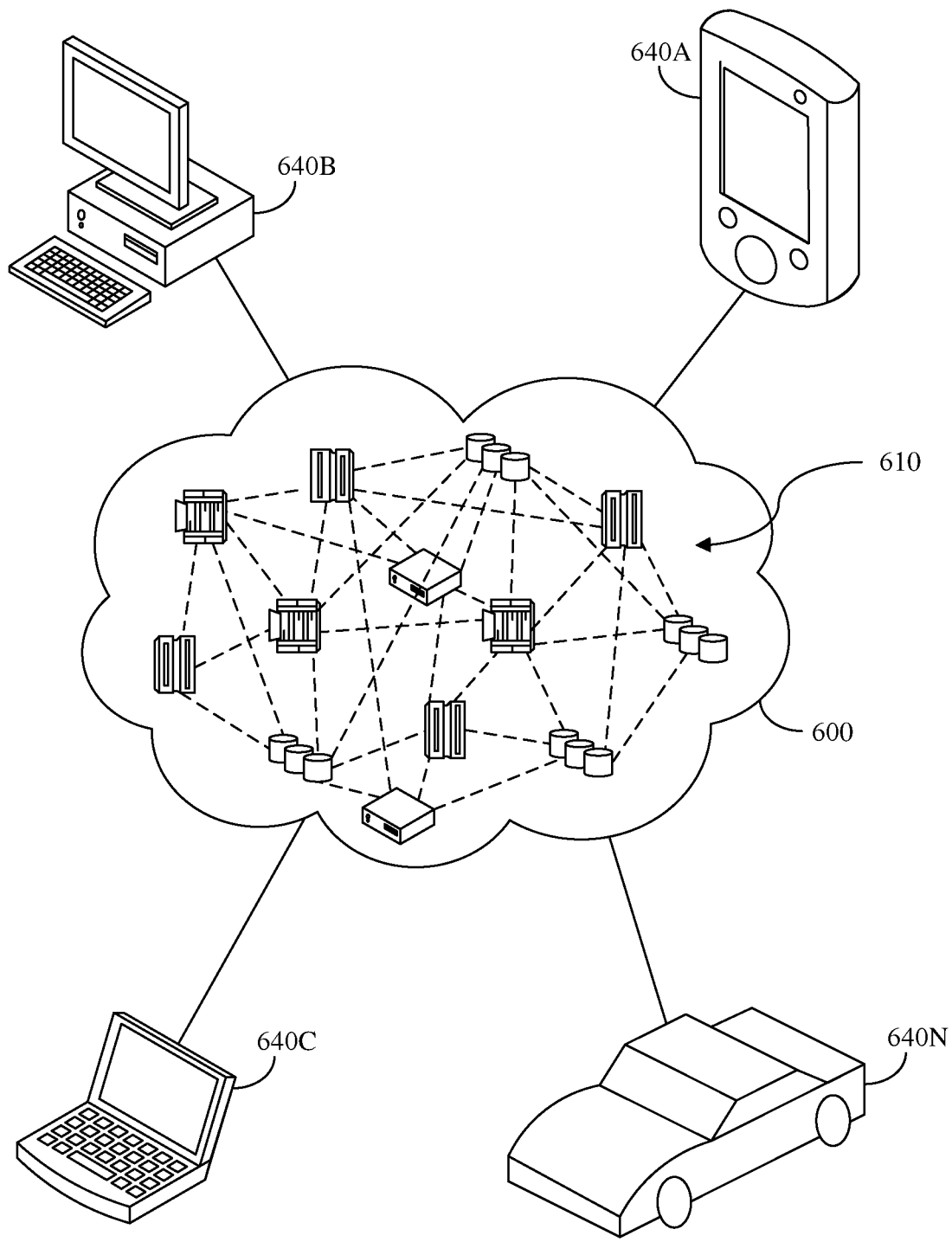
FIG. 6 depicts a cloud computing environment according to an embodiment.

Referring now to FIG. 6, illustrative cloud computing environment 600 is depicted. As shown, cloud computing environment 600 includes one or more cloud computing nodes 610 with which local computing devices used by cloud consumers, such as, for example, personal digital assistant (PDA) or cellular telephone 640a, desktop computer 640b, laptop computer 640c, and/or automobile computer system 640n may communicate. Computing nodes 610 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 640a-n shown in FIG. 6 are intended to be illustrative only and that computing nodes 610 and cloud computing environment 600 can communicate with any type of computerized device over any type of network and/or network addressable connection (e.g., using a web browser).

Figure 7:
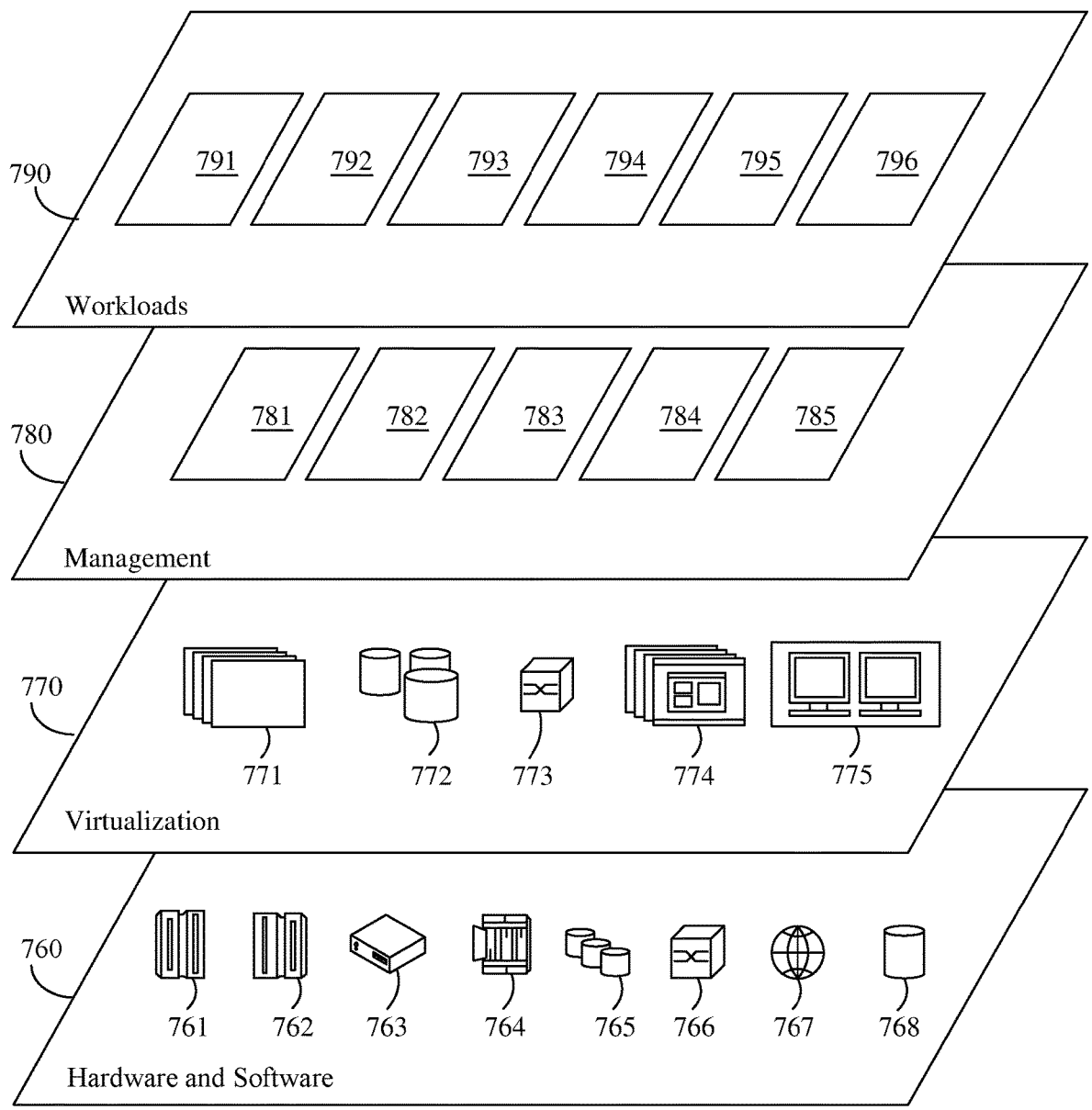
FIG. 7 depicts abstraction model layers according to an embodiment.

Referring now to FIG. 7, a set of functional abstraction layers provided by cloud computing environment 600 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include mainframes 761; RISC (Reduced Instruction Set Computer) architecture-based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and PST 796.

Figure 8:
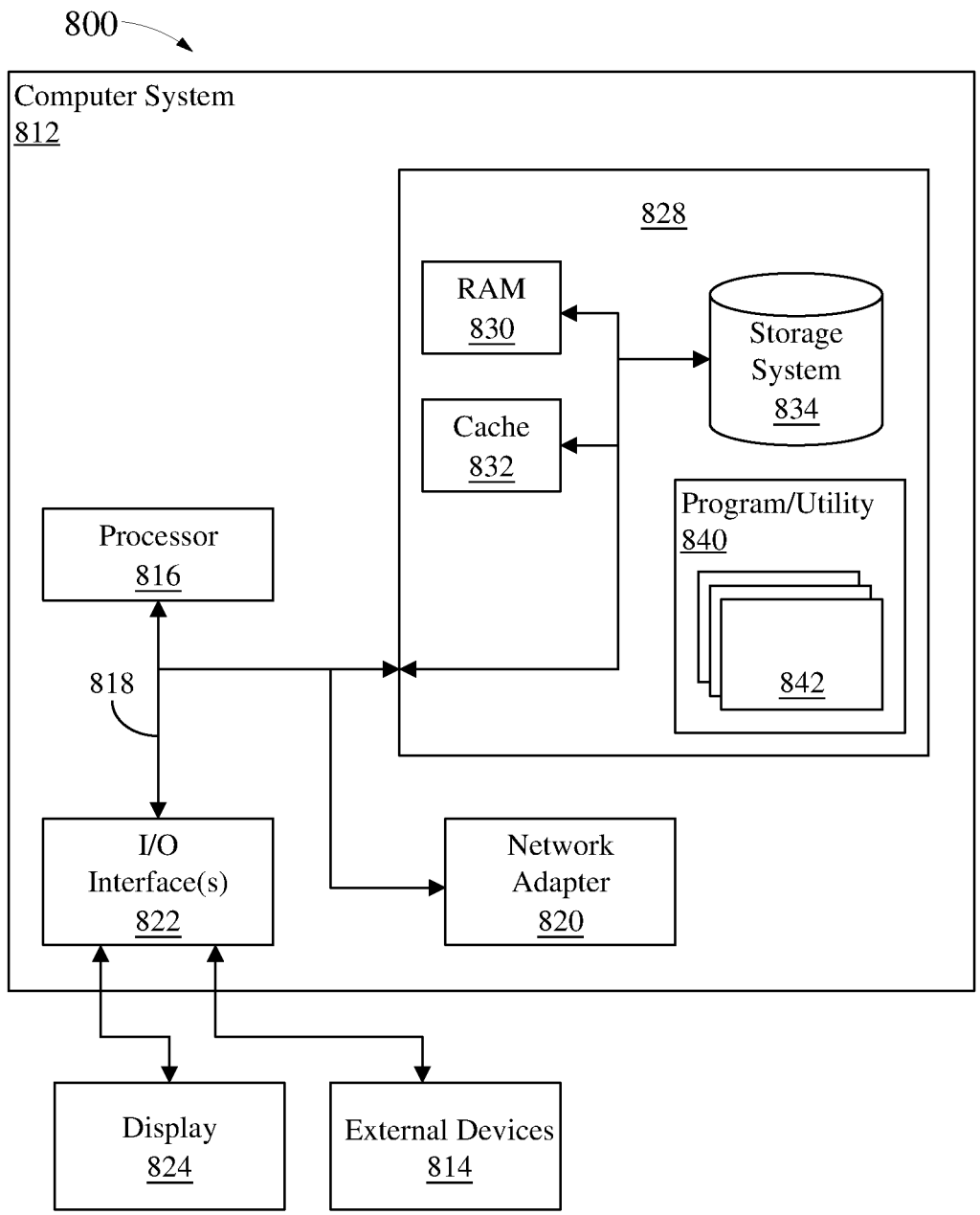
FIG. 8 depicts a cloud computing node according to an embodiment.

FIG. 8 illustrates a schematic of an example of a computing node 800. In one or more embodiments, computing node 800 is an example of a suitable cloud computing node. Computing node 800 is not intended to suggest any limitation as to the scope of use or functionality of embodiments of the invention described herein. Computing node 800 is capable of performing any of the functionality described within this disclosure.

Computing node 800 includes a computer system 812, which is operational with numerous other general-purpose or special-purpose computing system environments or configurations. Examples of well-known computing systems, environments, and/or configurations that may be suitable for use with computer system 812 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 812 may be described in the general context of computer system-executable instructions, such as program modules, being executed by a computer system. Generally, program modules may include routines, programs, objects, components, logic, data structures, and so on that perform particular tasks or implement particular abstract data types. Computer system 812 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system 812 is shown in the form of a general-purpose computing device. The components of computer system 812 may include, but are not limited to, one or more processors 816, a memory 828, and a bus 818 that couples various system components including memory 828 to processor 816. As defined herein, "processor" means at least one hardware circuit configured to carry out instructions. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

The carrying out of instructions of a computer program by a processor comprises executing or running the program. As defined herein, "run" and "execute" comprise a series of actions or events performed by the processor in accordance with one or more machine-readable instructions. "Running" and "executing," as defined herein refer to the active performing of actions or events by the processor. The terms run, running, execute, and executing are used synonymously herein.

Bus 818 represents one or more of any of several types of bus structures, including a memory bus or memory controller, a peripheral bus, an accelerated graphics port, and a processor or local bus using any of a variety of bus architectures. By way of example only, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI Express (PCIe) bus.

Computer system 812 typically includes a variety of computer system-readable media. Such media may be any available media that is accessible by computer system 812, and may include both volatile and non-volatile media, removable and non-removable media.

Memory 828 may include computer system readable media in the form of volatile memory, such as random-access memory (RAM) 830 and/or cache memory 832. Computer system 812 may further include other removable/non-removable, volatile/non-volatile computer system storage media. By way of example, storage system 834 can be provided for reading from and writing to a non-removable, non-volatile magnetic media and/or solid-state drive(s) (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 818 by one or more data media interfaces. As will be further depicted and described below, memory 828 may include at least one program product having a set (e.g., at least one) of program modules that are configured to carry out the functions of embodiments of the invention.

Program/utility 840, having a set (at least one) of program modules 842, may be stored in memory 828 by way of example, and not limitation, as well as an operating system, one or more application programs, other program modules, and program data. Each of the operating system, one or more application programs, other program modules, and program data or some combination thereof, may include an implementation of a networking environment. Program modules 842 generally carry out the functions and/or methodologies of embodiments of the invention as described herein. For example, one or more of the program modules may include PST 796 or portions thereof.

Program/utility 840 is executable by processor 816. Program/utility 840 and any data items used, generated, and/or operated upon by computer system 812 are functional data structures that impart functionality when employed by computer system 812. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer system 812 may also communicate with one or more external devices 814 such as a keyboard, a pointing device, a display 824, etc.; one or more devices that enable a user to interact with computer system 812; and/or any devices (e.g., network card, modem, etc.) that enable computer system 812 to communicate with one or more other computing devices. Such communication can occur via input/output (I/O) interfaces 822. Still, computer system 812 can communicate with one or more networks such as a local area network (LAN), a general wide area network (WAN), and/or a public network (e.g., the Internet) via network adapter 820. As depicted, network adapter 820 communicates with the other components of computer system 812 via bus 818. It should be understood that although not shown, other hardware and/or software components could be used in conjunction with computer system 812. Examples, include, but are not limited to: microcode, device drivers, redundant processing units, external disk drive arrays, RAID systems, tape drives, and data archival storage systems, etc.

While computing node 800 is used to illustrate an example of a cloud computing node, it should be appreciated that a computer system using an architecture the same as or similar to that described in connection with FIG. 8 may be used in a non-cloud computing implementation to perform the various operations described herein. In this regard, the example embodiments described herein are not intended to be limited to a cloud computing environment. Computing node 800 is an example of a data processing system. As defined herein, "data processing system" means one or more hardware systems configured to process data, each hardware system including at least one processor programmed to initiate operations and memory.

Computing node 800 is an example of computer hardware. Computing node 800 may include fewer components than shown or additional components not illustrated in FIG. 8 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

Computing node 800 is also an example of a server. As defined herein, "server" means a data processing system configured to share services with one or more other data processing systems. As defined herein, "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. In one or more embodiments, the various user devices described herein may be client devices. Network infrastructure, such as routers, firewalls, switches, access points and the like, are not client devices as the term "client device" is defined herein.

The terminology used herein is for the purpose of describing particular embodiments only and is not intended to be limiting. Notwithstanding, several definitions that apply throughout this document now will be presented.

As defined herein, the singular forms "a," "an," and "the" include the plural forms as well, unless the context clearly indicates otherwise.

As defined herein, "another" means at least a second or more.

As defined herein, "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, "automatically" means without user intervention.

As defined herein, "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, "if" means "in response to" or "responsive to," depending upon the context. Thus, the phrase "if it is determined" may be construed to mean "in response to determining" or "responsive to determining" depending on the context. Likewise the phrase "if [a stated condition or event] is detected" may be construed to mean "upon detecting [the stated condition or event]" or "in response to detecting [the stated condition or event]" or "responsive to detecting [the stated condition or event]" depending on the context.

As defined herein, "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, "output" means storing in physical memory elements, e.g., devices, writing to display or other peripheral output device, sending or transmitting to another system, exporting, or the like.

As defined herein, the phrases "in response to" and "responsive to" mean responding or reacting readily to an action or event. Thus, if a second action is performed "in response to" or "responsive to" a first action, there is a causal relationship between an occurrence of the first action and an occurrence of the second action. The phrases "in response to" and "responsive to" indicate the causal relationship.

The term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    discovering a plurality of container remnants by electronically scanning portions of computer memory of at least one computer system of one or more computing nodes, wherein the portions of computer memory are allocated to persistent storage of computer data, and wherein each container remnant contains computer data providing a record of system-generated execution attributes generated in response to execution of one or more containerized applications;
    identifying among the plurality of container remnants one or more inactive container remnants unutilized by a currently running application;
    categorizing each inactive container remnant, wherein the categorizing is based on system-generated execution attributes contained in each container remnant identified as an inactive container remnant;
    based on the categorizing, identifying a previously run containerized application by reference to a database comprising data whose structure maps identities of containerized applications to patterns of execution attributes; and
    freeing up, by a processor, computing resources by deleting an ephemeral container of the previously run containerized application.

2. The method of claim 1, wherein the identifying one or more inactive container remnants comprises:
    identifying container remnants persistently stored in the portions of computer memory of the at least on computer system of the one or more computing nodes;
    classifying each identified container remnant utilized by a currently running containerized application as an active container remnant; and
    classifying each remaining container remnant as an inactive container remnant.

3. The method of claim 2, wherein a persistently stored container remnant containing a file handle is classified as a container remnant utilized by a currently running containerized application, the currently running containerized application corresponding to the file handle.

4. The method of claim 2, wherein a persistently stored container remnant comprises a persistent volume and wherein the persistent volume is classified as a container remnant utilized by a currently running containerized application that is bound to the persistent volume by a persistent volume claim.

5. The method of claim 1, wherein the categorizing comprises:
    performing pattern recognition, using a statistical clustering algorithm, on the system-generated execution attributes contained in each inactive container remnant; and
    assigning each inactive container remnant containing same or statistically similar patterns of execution attributes to a same category.

6. The method of claim 1, wherein the structure of the data comprises a file name and file extension that map to a containerized application name.

7. The method of claim 1, further comprising inserting into an evidence-of-execution data structure an identity, determined by reference to the database, of the previously run containerized application.

* * * * *